US010383350B2

(12) United States Patent
McCormick et al.

(10) Patent No.: US 10,383,350 B2
(45) Date of Patent: Aug. 20, 2019

(54) STENCIL HOLDER APPARATUS AND METHOD

(71) Applicants: Ginny McCormick, Kaufman, TX (US); Douglas Levack, Kaufman, TX (US)

(72) Inventors: Ginny McCormick, Kaufman, TX (US); Douglas Levack, Kaufman, TX (US)

(*) Notice: Subject to any disclaimer, the term of this patent is extended or adjusted under 35 U.S.C. 154(b) by 0 days.

(21) Appl. No.: 15/942,433

(22) Filed: Mar. 31, 2018

(65) Prior Publication Data

US 2018/0220684 A1    Aug. 9, 2018

Related U.S. Application Data

(62) Division of application No. 14/827,279, filed on Aug. 15, 2015, now abandoned.

(60) Provisional application No. 62/052,624, filed on Sep. 19, 2014.

(51) Int. Cl.
| | |
|---|---|
| *B41F 15/34* | (2006.01) |
| *B41F 15/36* | (2006.01) |
| *A23L 5/40* | (2016.01) |
| *A23G 3/28* | (2006.01) |
| *A21C 15/00* | (2006.01) |
| *A21D 13/20* | (2017.01) |

(52) U.S. Cl.
CPC .............. *A23L 5/40* (2016.08); *A21C 15/002* (2013.01); *A21D 13/20* (2017.01); *A23G 3/28* (2013.01); *B41F 15/34* (2013.01); *A23V 2002/00* (2013.01); *B41F 15/36* (2013.01)

(58) Field of Classification Search
CPC .......... B41F 15/34; B41F 15/36; B41L 13/00; B41L 13/10; A23L 1/0047; A23L 5/40; A21D 13/20; A23V 2002/00; A23G 3/28; A21C 15/002
See application file for complete search history.

(56) References Cited

U.S. PATENT DOCUMENTS

| | | | | |
|---|---|---|---|---|
| 1,627,630 A | * | 5/1927 | Carter ................. | A21C 15/002 101/114 |
| 4,451,997 A | * | 6/1984 | Jones ...................... | D05C 1/02 160/380 |
| 5,355,792 A | * | 10/1994 | MacNaughton ........ | B05C 17/06 101/127.1 |

(Continued)

FOREIGN PATENT DOCUMENTS

| | | | | | |
|---|---|---|---|---|---|
| CN | 206538513 U | * | 10/2017 | ............. | D01D 5/088 |
| KR | 2008003398 U | * | 8/2008 | ............... | E06B 9/52 |

OTHER PUBLICATIONS

Sweet Sugar Belle, Perfectly Stenciled Cookies Every Single Time—The Sweet Adventures of Sugar Belle, Oct. 20, 2013.*

*Primary Examiner* — Leslie J Evanisko
*Assistant Examiner* — Marissa Ferguson-Samreth (57) ABSTRACT

A frame operable to hold a stencil taut and secure for decorating a food product such as a cookie, baked good or the like. An embodiment of the frame is comprised of a bottom sub-frame having a first height and a top sub-frame having a second height, the second height being less than the first height, such that the frame accommodates one size of cookie when the bottom sub-frame is placed around the cookie, and accommodates a thinner cookie when the frame is flipped 180 degrees about a lateral axis and the top sub-frame is placed around the cookie.

3 Claims, 5 Drawing Sheets

(56) References Cited

U.S. PATENT DOCUMENTS

| | | | | |
|---|---|---|---|---|
| 5,864,909 | A * | 2/1999 | Liu | B26F 1/44 30/315 |
| 6,146,489 | A * | 11/2000 | Wirth | H01L 31/02322 118/504 |
| 6,276,426 | B1 * | 8/2001 | Polak | B60J 1/1853 160/105 |
| 6,926,840 | B2 * | 8/2005 | Clark | C23C 14/042 216/12 |
| 8,366,946 | B2 * | 2/2013 | Ferguson | B23Q 3/062 118/30 |
| 2006/0098280 | A1 * | 5/2006 | Yamauchi | G03B 21/60 359/454 |
| 2008/0022542 | A1 * | 1/2008 | Brosmith | B26B 5/00 33/562 |
| 2012/0227597 | A1 * | 9/2012 | Meeus | B41F 15/36 101/126 |
| 2014/0290509 | A1 * | 10/2014 | Bennett | B41F 15/36 101/127.1 |

* cited by examiner

STENCIL HOLDER APPARATUS AND METHOD

CROSS-REFERENCE TO RELATED APPLICATION

This application claims priority to the following provisional application: U.S. Ser. No. 62/052,624, filed Sep. 19, 2014 entitled: A TWO PIECE STENCIL HOLDER FOR USE BY COOKIE DECORATORS AND HOBBYISTS TO SECURELY HOLD THE STENCIL THEY USE TO AIRBRUSH ONTO A COOKIE OR OTHER ITEM, and is a Divisional application of U.S. Serial application Ser. No. 14/827,279, filed Aug. 15, 2015, entitled STENCIL HOLDER APPARATUS AND METHOD to the contents of which are incorporated herein by reference.

FIELD OF THE INVENTION

The invention relates to apparatus and utensils used to decorate food products and baked goods such as cookies, cupcakes, cakes and the like, and methods of using such apparatus and utensils.

BACKGROUND

Bakers, hobbyists and cookiers (one who bakes cookies) often desire to decorate their food products and baked goods such as cookies, cupcakes, cakes and other items. Often, this is done using stencils. Disadvantageously, stencils must be re-secured, re-aligned and re-steadied when moving from one cookie, baked item or other item, to another while airbrushing. This is a time consuming process, and often leads to errors such as overspray or misaligned designs. One method that bakers, hobbyists and cookiers use to overcome these problems is to use a stack of magnets on a cookie sheet to secure the stencil to the sheet and the stack of magnets. However, this is an inefficient and time consuming process as the stencil must be reset and realigned with every cookie, baked item or item being decorated. What is desired is an apparatus to hold the stencil taut and secure and which can be easily moved from one cookie, baked item or item, to the next with no additional set up time.

SUMMARY OF THE INVENTION

The present invention comprises a frame operable to hold a stencil taut and secure. The invention can be easily moved from one cookie, baked item or item to the next with minimal additional set up time. One embodiment of the frame is comprised of a bottom sub-frame having a first height, and a top sub-frame having a second height that is less than the first height, such that the bottom sub-frame accommodates one size of cookie when the bottom sub-frame is placed around the cookie and accommodates a thinner cookie when the frame is flipped 180 degrees along a lateral axis and the top sub-frame is placed around the cookie. The invention further is a two piece stencil holder for use by cookie decorators to secure a stencil when airbrushing a design onto a cookie. With the use of the frame, the stencil is held taut and secure and can be easily moved from one cookie to the next with no additional set up time.

BRIEF DESCRIPTION OF THE DRAWINGS

Other features of the invention will become clear from the following description, taken together with the accompanying drawings, wherein.

DESCRIPTION OF THE INVENTION

The present invention comprises a frame having a bottom sub-frame and a top sub-frame with an opening formed by the interior sides thereof. By placing a stencil between the two sub-frames of the holder, which snap together with the use of, inter alia, magnets, the stencil is held secure. Preferably the stencil is held at the height of either ¼" or ⅜", depending on the position of the bottom sub-frame with respect to the food item being decorated. The stencil, as held by the frame (also referred to as a "holder"), can easily be lifted and moved from cookie to cookie or item to item while decorating without resetting the frame.

With the use of the bottom sub-frame and top sub-frame, the stencil is held taut and secure therein-between and can be easily moved from one item to the next with no additional set up time. One embodiment of the two-part frame is comprised of a bottom sub-frame having a first height and a top sub-frame having a second height, the second height being less than the first height, such that the frame accommodates one size of cookie when the bottom sub-frame is placed around the cookie, and accommodates a thinner cookie when the frame is flipped 180 degrees about a lateral axis and the top sub-frame is placed around the cookie.

Without limiting the dimensions of the invention, an embodiment of the invention has dimensions and characteristics as follows:

1. Bottom sub-frame having ¼ inch height and four 5.5 inch sides joined as a square, made of plastic, the sides forming a 5 inches squared opening with cavities for magnets, such as neodyne magnets, to be secured therein with adhesives.

2. Top sub-frame having ⅜ inch height and four 5.5 inch sides joined as a square, made of plastic, the sides forming a 5 inches squared opening with cavities for magnets, such as neodyne magnets, to be secured therein with adhesives.

3. Four (4) neodyne magnets that are secured in each corner formed by the sides of the top sub-frame and four (4) neodyne magnets that are secured in each corner formed by the sides of the bottom side-frame, for a total of 8 magnets. The height of the sides disclosed are for illustration only and may be any height that is suitable for decorating a food or other item.

Once the magnets are secured into place with the use of a strong adhesive, the bottom sub-frame is held securely to the top sub-frame with the stencil therein-between. In this way, the stencil is held securely in place at the right height above the cookie to be airbrushed.

In an embodiment, the bottom sub-frame and top sub-frame are preferably fabricated from Acrylonitrile Butadiene Styrene (ABS) or Polylactic Acid (PLA) plastic or by injection molding plastic into desired frame shape. The magnets are then adhered into the bottom sub-frame and top sub-frame. Other material from which the bottom sub-frame and top sub-frame can be fabricated include, but are not limited to, Polyethylene terephthalate (PET or PETE), High density polyethylene (HDPE), Polyvinyl chloride (PVC), Low-density polyethylene (LDPE), or Polypropylene (PP).

In an embodiment, the user positions the bottom sub-frame with the exposed polarity of the magnets facing up and places a stencil on the top of the bottom sub-frame. The top sub-frame, with the exposed magnets facing downward, is then co-axially aligned with the bottom sub-frame. The magnetic force of the first polarity of the exposed magnets of the bottom sub-frame will attract, via the magnetic force of the second polarity of the exposed magnets, the exposed magnets of the top sub-frame. For example, the first polarity can be magnetic north and the second polarity can be magnetic south, or vice versa. The two sub-frames, when pulled together by the interacting magnetic forces, will hold the stencil taut between them. If a user is decorating a thin cookie or item, then the user will use, as a bottom sub-frame, a sub-frame having sides with a height (z) of ⅜ inch. If the user is decorating a thicker cookie or item, then they will use as a bottom sub-frame, a sub-frame having sides with a height (z) of ½ inch. The assembled frame is then placed over the item to be airbrushed.

In an alternative embodiment, in place of a bottom sub-frame, a bottom assembly of two parallel bars can be used to hold the stencil to the top sub-frame as further described herein. The present invention can also be used effectively by other crafting fields to hold stencils in place for decorating items placed within the opening of the bottom sub-frame.

Figure 1:
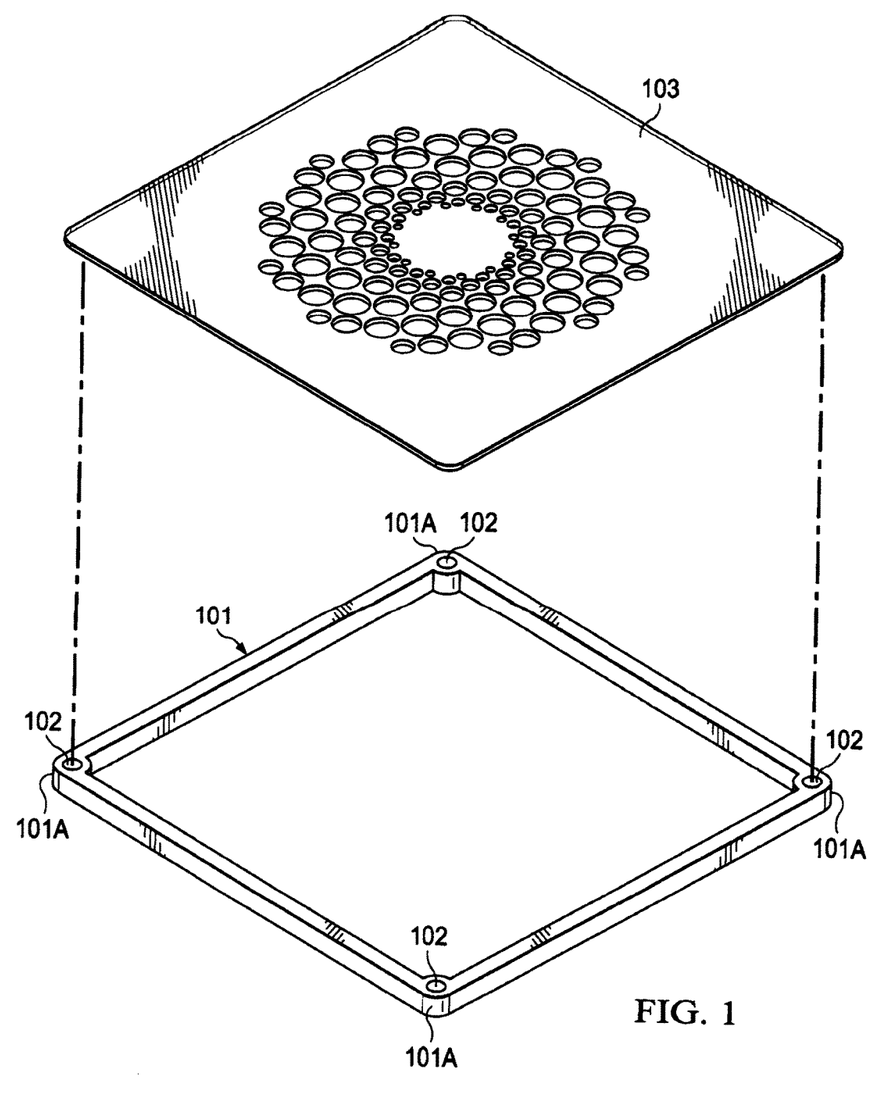
FIG. 1 is a perspective view of the bottom sub-frame with magnets facing up.

Referring now to FIG. 1, there is a perspective view of the bottom sub-frame 101 with magnets 102 facing up.

Figure 2:
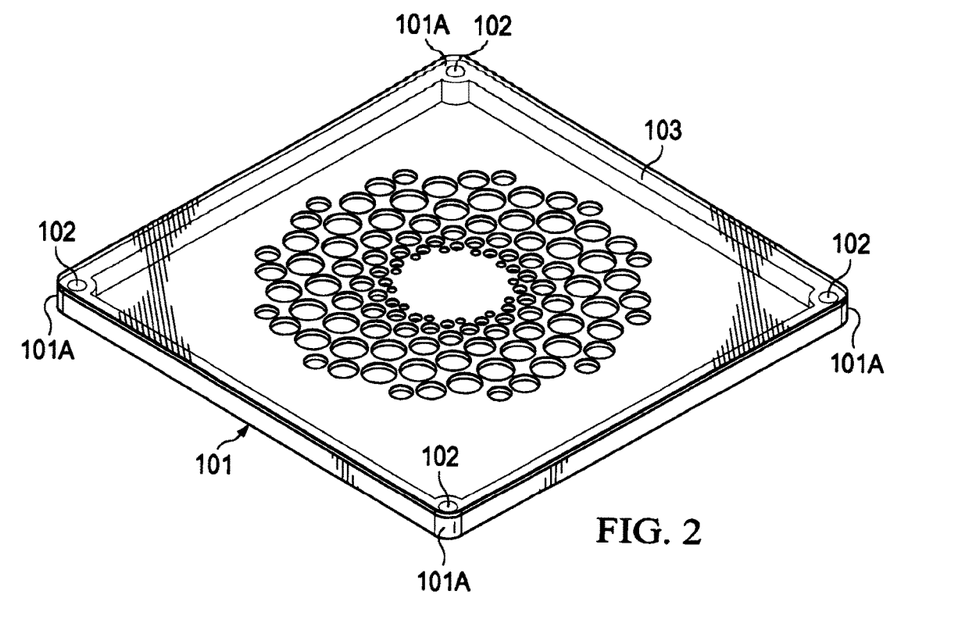
FIG. 2 is a perspective view of the bottom sub-frame with magnets facing up and stencil aligned thereon.

Referring now to FIG. 2, there is a perspective view of the bottom sub-frame 101 with magnets 102 facing up and stencil aligned thereon.

Figure 3:
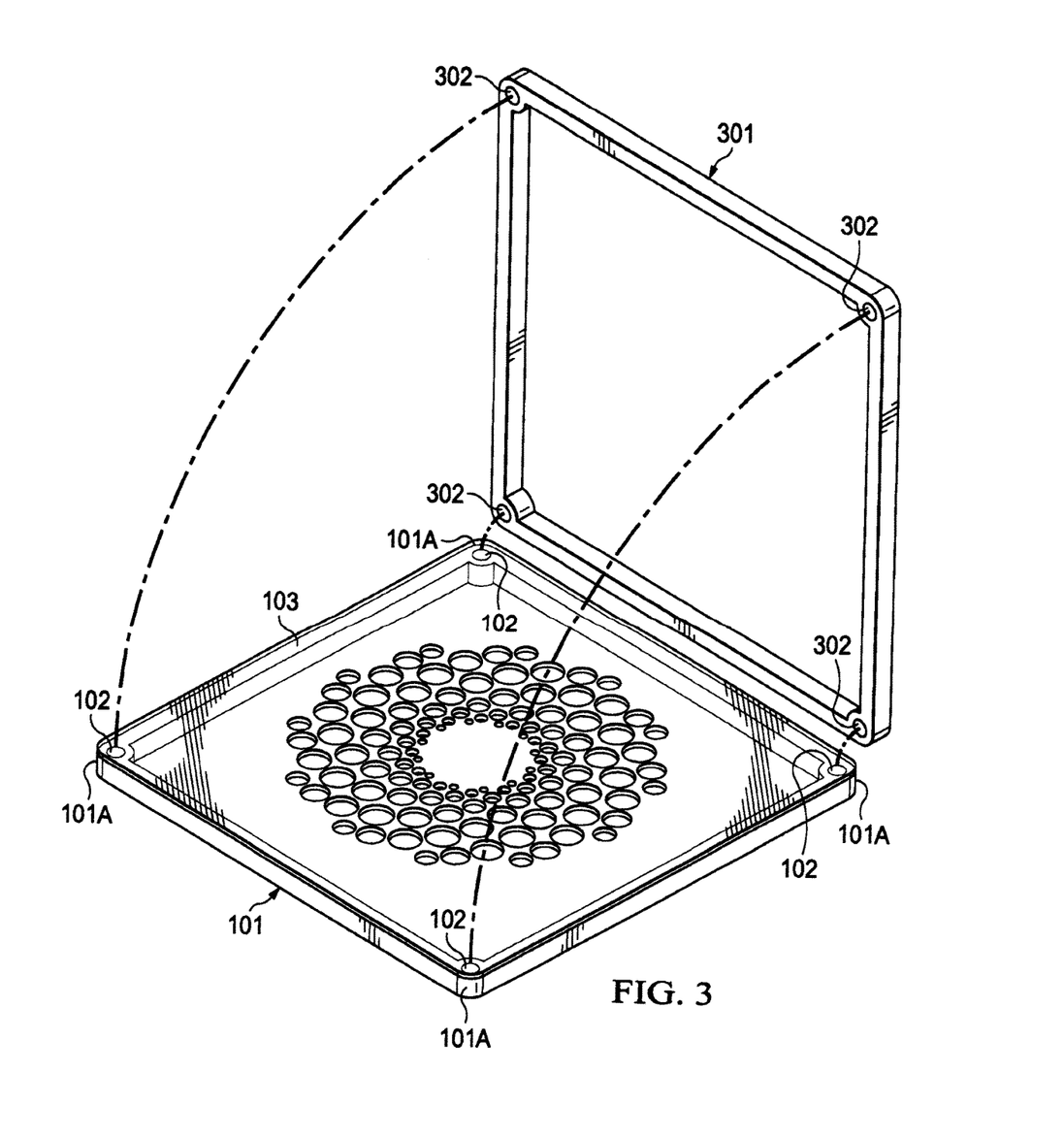
FIG. 3 is a perspective view of the bottom sub-frame with magnets facing up and stencil aligned thereon and top sub-frame with magnets facing down about to be placed thereon.

Referring now to FIG. 3, there is a perspective view of the bottom sub-frame 101 with magnets 102 facing up and stencil 103 aligned thereon and top sub-frame 301 with magnets 302 facing down about to be placed thereon.

Figure 4:
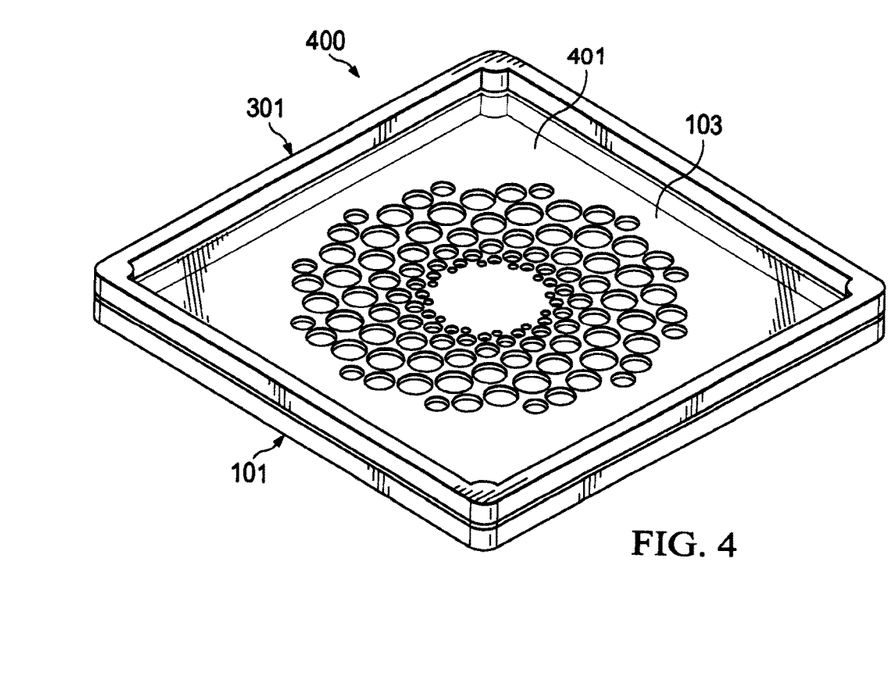
FIG. 4 is a perspective view of the bottom sub-frame with magnets facing up and stencil aligned thereon and top sub-frame with magnets facing down placed thereon.

Referring now to FIG. 4, there is a perspective view of the bottom sub-frame 101 with magnets 102 facing up and stencil 103 aligned thereon and top sub-frame 301 with magnets 302 facing down placed thereon. As seen therein, there is an apparatus for decorating cookies, baked items or other items, comprising a frame 400, the frame 400 comprising a bottom sub-frame 101 and a top sub-frame 301, the top sub-frame 301 and bottom sub-frame 101 having complementary shapes in at least two (x, y) of their three (x, y, z) dimensions. The frame 400 has an opening 401 formed by the sides of the bottom sub-frame and top sub-frame; and a coupling mechanism for semi-permanently coupling the bottom sub-frame to the top sub-frame.

The coupling mechanism comprises at least one magnet exposing a first polarity positioned on the bottom sub-frame 101 and at least one magnet exposing a second polarity positioned on the top sub-frame 301, wherein the exposed polarities of the magnets align and attract each other when the top sub-frame is co-axially aligned and positioned on the bottom sub-frame.

The frame 400 as seen in FIG. 4 further comprises a quadrilateral shape, having length (x), width (y) and height (z) dimensions, the bottom sub-frame 101 and top sub-frame 301 having substantially equivalent length (x) and width (y) dimensions. The bottom sub-frame 101 further comprises a bottom sub-frame first side, a bottom sub-frame second side, a bottom sub-frame third side and a bottom sub-frame fourth side, wherein each of the bottom sub-frame first side, bottom sub-frame second side, bottom sub-frame third side and bottom sub-frame fourth side has a substantially linear length, substantially linear width and substantially linear height forming a rectangular parallelepiped or cuboid and wherein each of the bottom sub-frame first side, bottom sub-frame second side, bottom sub-frame third side and bottom sub-frame fourth side has a proximate end and a distal end.

The proximate end of the bottom sub-frame first side is coupled to the distal end of the bottom sub-frame second side, forming a corner having a 90 degree angle between the bottom sub-frame first side and bottom sub-frame second side.

The proximate end of the bottom sub-frame second side is coupled to the distal end of the bottom sub-frame third side, forming a corner having a 90 degree angle between the bottom sub-frame second side and bottom sub-frame third side;

The proximate end of the bottom sub-frame third side is coupled to the distal end of the bottom sub-frame fourth side, forming a corner having a 90 degree angle between the bottom sub-frame third side and bottom sub-frame fourth side.

The proximate end of the bottom sub-frame fourth side is coupled to the distal end of the bottom sub-frame first side, forming a corner having a 90 degree angle between the bottom sub-frame fourth side and bottom sub-frame first side.

The top sub-frame further comprises a top sub-frame first side, a top sub-frame second side, a top sub-frame third side and a top sub-frame fourth side. Each of the top sub-frame first side, top sub-frame second side, top sub-frame third side and top sub-frame fourth side has a substantially linear length, substantially linear width and substantially linear height forming a rectangular parallelepiped or cuboid.

Each of the top sub-frame first side, top sub-frame second side, top sub-frame third side and top sub-frame fourth side has a proximate end and a distal end.

The proximate end of the top sub-frame first side is coupled to the distal end of the top sub-frame second side, forming a corner having a 90 degree angle between the top sub-frame first side and top sub-frame second side.

The proximate end of the top sub-frame second side is coupled to the distal end of the top sub-frame third side, forming a corner having a 90 degree angle between the top sub-frame second side and top sub-frame third side.

The proximate end of the top sub-frame third side is coupled to the distal end of the top sub-frame fourth side, forming a corner having a 90 degree angle between the top sub-frame third side and top sub-frame fourth side.

The proximate end of the top sub-frame fourth side is coupled to the distal end of the top sub-frame first side, forming a corner having a 90 degree angle between the top sub-frame fourth side and top sub-frame first side.

In an embodiment, the frame 400 comprises a square shape with an opening 401 therein, the frame having length (x), width (y) and height (z) dimensions and further wherein the length (x) of the top sub-frame is substantially equivalent to that of the bottom sub-frame; further wherein the width (y) of the top sub-frame is substantially equivalent to that of the bottom sub-frame; further wherein the height (z) of the top sub-frame is substantially equivalent to that of the bottom sub-frame; and wherein the length (x) of the frame and width (y) of the frame are substantially equivalent.

In a further embodiment, frame 400 comprises a rectangular shape with an opening 401 therein, the frame having length (x), width (y) and height (z) dimensions; further wherein the length (x) of the top sub-frame is substantially equivalent to that of the bottom sub-frame; further wherein the width (y) of the top sub-frame is substantially equivalent to that of the bottom sub-frame; further wherein the height (z) of the top sub-frame is substantially equivalent to that of the bottom sub-frame; and wherein the length (x) of the frame and width (y) of the frame are different.

In each of such embodiments, the coupling mechanism used in frame 400 comprises a plurality of magnets 102 positioned on the bottom sub-frame and a plurality of magnets 302 positioned on the top sub-frame, wherein the magnets 102, 302 have exposed polarities aligned so as to attract to each other when the top sub-frame is aligned and positioned on the bottom sub-frame.

The frame 400 further includes magnets 102, 302 arranged as follows: a first magnet exposing a first polarity is positioned at the corner of the bottom sub-frame first side and bottom sub-frame second side; a second magnet exposing a first polarity is positioned at the corner of the bottom sub-frame second side and bottom sub-frame third side; a third magnet exposing a first polarity is positioned at the corner of the bottom sub-frame third side and bottom sub-frame fourth side; a fourth magnet exposing a first polarity is positioned at the corner of the bottom sub-frame fourth side and bottom sub-frame first side; a fifth magnet exposing a second polarity is positioned at the corner of the top sub-frame first side and top sub-frame second side; a sixth magnet exposing a second polarity is positioned at the corner of the top sub-frame second side and top sub-frame third side; a seventh magnet exposing a second polarity is positioned at the corner of the top sub-frame third side and top sub-frame fourth side; and an eighth magnet exposing a second polarity is positioned at the corner of the top sub-frame fourth side and top sub-frame first side.

As seen in the Figures, in an embodiment, the magnets 102, 302 are of a cylindrical shape having a diameter (d) and length (I). Further, as seen in FIG. 4, each corner of the bottom sub-frame and top sub-frame is dimensioned to have a convex outside wall and convex inside wall, and a cylindrical cavity formed in each corner, each magnet being axially positioned and secured in a respective cylindrical cavity.

An embodiment further comprises the frame 400 in combination with a stencil, wherein the stencil is positioned between the top sub-frame and bottom sub-frame.

In an embodiment, the magnets are of the neodyne variety secured with an adhesive within the bottom sub-frame and top sub-frame respectively.

Figure 5:
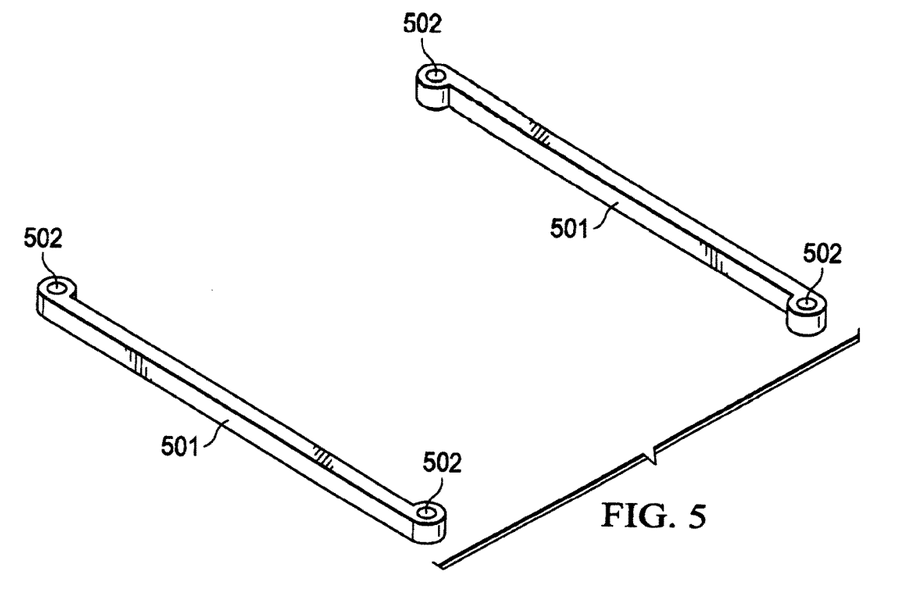
FIG. 5 is a perspective view of bars with magnets facing up in place of the bottom sub-frame.

Referring now to FIG. 5, there is a perspective view of parallel bars 501 with magnets 502 facing up in place of the bottom sub-frame 101.

Figure 6:
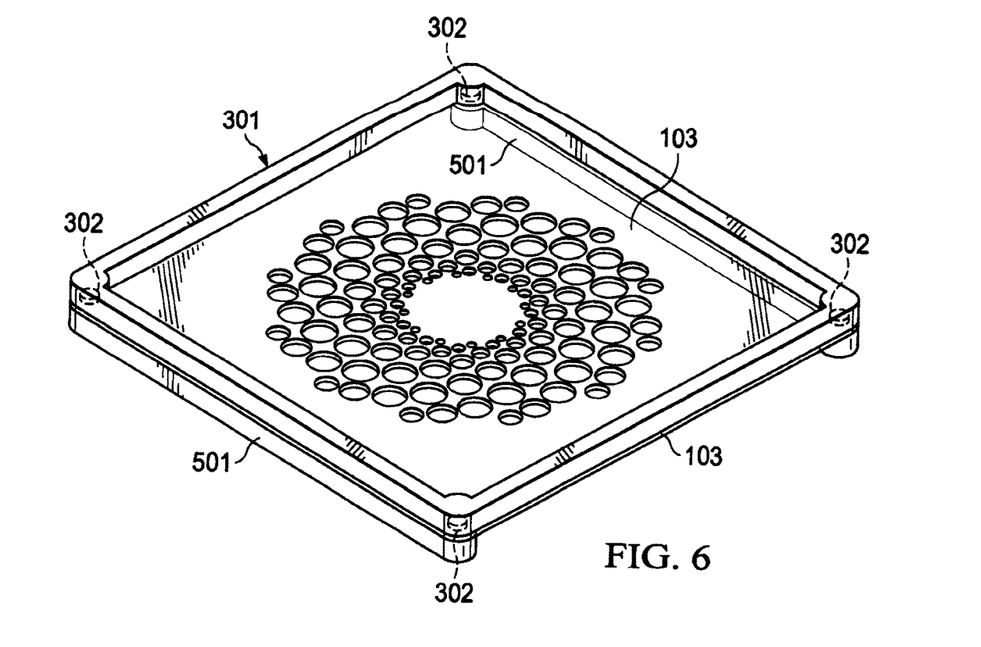
FIG. 6 is a perspective view of bars with magnets facing up in place of the bottom sub-frame with magnets facing up and stencil aligned thereon and top frame with magnets facing down placed thereon.

Referring now to FIG. 6, there is a perspective view of parallel bars 501 with magnets 502 facing up in place of the bottom sub-frame 101 with magnets 102 facing up and stencil 103 aligned thereon and top frame with magnets facing down placed thereon.

In such embodiment, the frame apparatus holds a stencil, comprising a bottom assembly of two parallel bars and a top sub-frame having a quadrilateral shape, the frame apparatus having an opening formed within the sides of the bottom assembly and the sides of the top sub-frame; and a coupling mechanism for semi-permanently coupling the bottom assembly to the top sub-frame, said coupling mechanism being a set of magnets, wherein the exposed polarity of the magnets are positioned so that the top sub-frame is attracted to the bottom assembly.

Figure 7:
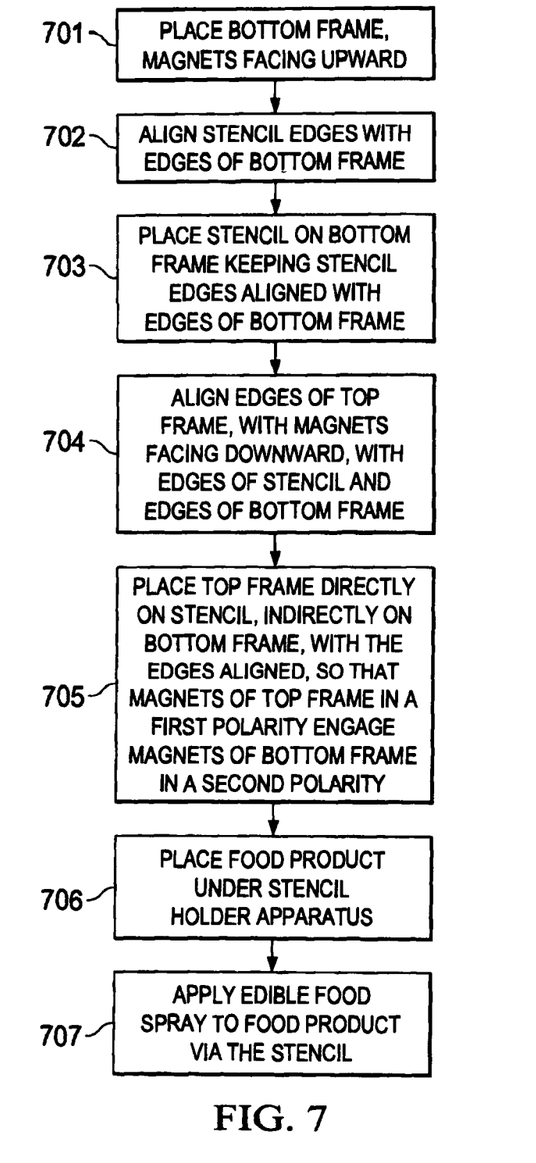
FIG. 7 is a flow chart describing the process embodiment of the invention.

Referring now to FIG. 7, there is a flow chart describing the process embodiment of the invention. In step 701, a bottom frame is positioned, magnets facing upward. In step 702, stencil edges are aligned with edges of bottom frame. In step 703, a stencil is placed on a bottom frame keeping stencil edges aligned with edges of bottom frame. In step 704, edges of the top frame are aligned, with magnets facing downward, with edges of stencil and edges of bottom frame. In step 705 the top frame is aligned directly on the stencil, indirectly on bottom frame, with the edges aligned, so that magnets of top frame in a first polarity engage magnets of the bottom frame in a second polarity. In step 706, a food product is placed under the stencil holder apparatus. In step 707, edible food spray is applied to the food product via the stencil.

The method of securing a stencil for decorating an item, further comprises the steps of positioning a bottom sub-frame having a quadrilateral shape and an opening, the bottom sub-frame having facing up magnets exposing a first polarity at each corner of its quadrilateral shape, aligning a stencil on the bottom sub-frame; and positioning a top sub-frame having a quadrilateral shape and an opening, the top sub-frame having magnets facing down exposing a second polarity at each corner of its quadrilateral shape.

The method further comprises the step of placing an item under the stencil, wherein the item is one selected from the group consisting of a cookie, a baked good, a cupcake or a cake. The method further comprises the step of applying a spray-able decorative frosting to the item under the stencil.

While the present invention has been described by reference to certain embodiments, it is pointed out that the embodiments described are illustrative rather than limiting in nature and that many variations and modifications are possible within the scope of the present invention. For example, the frame can be also be designed in other sizes to accommodate other styles and sizes of stencils. Many such variations and modifications may be considered obvious and desirable by those skilled in the art based upon a review of the foregoing description of preferred embodiments.

We claim:

1. A method of securing a stencil for decorating an item, comprising the steps of:
    positioning a bottom sub-frame having a quadrilateral shape and an opening, the bottom sub-frame having facing up magnets exposing a first polarity at each corner of its quadrilateral shape;
    aligning a stencil on the bottom sub-frame; and
    positioning a top sub-frame having a quadrilateral shape and an opening, the top sub-frame having magnets facing down exposing a second polarity at each corner of its quadrilateral shape; and
    placing an item under the stencil, wherein the item is one selected from the group consisting of a cookie, a baked good, a cupcake or a cake.

2. A method of securing a stencil for decorating an item, comprising the steps of:
    positioning a bottom sub-frame having a quadrilateral shape and an opening, the bottom sub-frame having facing up magnets exposing a first polarity at each corner of its quadrilateral shape;

aligning a stencil on the bottom sub-frame; and positioning a top sub-frame having a quadrilateral shape and an opening, the top sub-frame having magnets facing down exposing a second polarity at each corner of its quadrilateral shape; and placing an item under the stencil, wherein the item is one selected from the group consisting of a cookie, a baked good, a cupcake or a cake; and applying a spray-able decorative frosting to the item under the stencil.

3. A method of decorating a cookie, comprising the steps of:

providing a frame, the frame having a bottom sub-frame and a top sub-frame, the top sub-frame and bottom sub-frame having complementary shapes in at least two (x, y) of their three (x, y, z) dimensions, the top sub-frame having at least a lower planar face and the bottom sub-frame having at least an upper planar face, the frame having an opening formed by the sides of the bottom sub-frame and top sub-frame; and a coupling mechanism for semi-permanently coupling the bottom sub-frame to the top sub-frame when the lower planar face of the top sub-frame is brought into proximity to the upper planar face of the bottom sub-frame and wherein the coupling mechanism comprises at least one magnet exposing a first polarity positioned on the bottom sub-frame and at least one magnet exposing a second polarity positioned on the top sub-frame, wherein the exposed polarities of the magnets align and attract each other when the top sub-frame is co-axially aligned and positioned on the bottom sub-frame; and placing a decorative stencil between the bottom sub-frame and the top subframe, wherein the decorative stencil is held in place between the upper planar face of the bottom sub-frame and the lower planar face of the top subframe;

placing a cookie beneath the decorative stencil; and applying a sprayable decorative frosting to the cookie through the decorative stencil.

* * * * *